US010663435B2

(12) United States Patent
Nguyen et al.

(10) Patent No.: US 10,663,435 B2
(45) Date of Patent: May 26, 2020

(54) ACOUSTIC RECEIVERS WITH CYLINDRICAL CRYSTALS

(71) Applicant: Halliburton Energy Services, Inc., Houston, TX (US)

(72) Inventors: Minh Dang Nguyen, Singapore (SG); Chung Chang, Houston, TX (US); Clinton Keith Bates, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 246 days.

(21) Appl. No.: 15/748,783

(22) PCT Filed: May 25, 2017

(86) PCT No.: PCT/US2017/034492
§ 371 (c)(1),
(2) Date: Jan. 30, 2018

(87) PCT Pub. No.: WO2017/210083
PCT Pub. Date: Dec. 7, 2017

(65) Prior Publication Data
US 2019/0011404 A1    Jan. 10, 2019

Related U.S. Application Data

(60) Provisional application No. 62/344,572, filed on Jun. 2, 2016.

(51) Int. Cl.
*G01H 11/08* (2006.01)
*G01N 29/24* (2006.01)
(Continued)

(52) U.S. Cl.
CPC .......... *G01N 29/2443* (2013.01); *G01H 3/00* (2013.01); *G01N 29/22* (2013.01); *G01N 29/24* (2013.01);
(Continued)

(58) Field of Classification Search
CPC .......... G01V 1/008; G01V 1/288; G01V 1/50; G01V 2210/1234; G01V 1/28; G01V 1/42;
(Continued)

(56) References Cited

U.S. PATENT DOCUMENTS 4,219,095 A    8/1980  Trouiller
4,432,077 A *  2/1984  Alhilali ................... G01V 1/44
                                                 367/31
(Continued)

FOREIGN PATENT DOCUMENTS

WO    2015081264 A1    6/2015

OTHER PUBLICATIONS

PCT International Search Report and Written Opinion issued in corresponding application No. PCT/US2017/034492 (filed May 25, 2017), dated Aug. 11, 2017, 15 pages.

*Primary Examiner* — Brandi N Hopkins
(74) *Attorney, Agent, or Firm* — Chamberlain Hrdlicka

(57) ABSTRACT

An acoustic receiver and method for acoustic logging. The acoustic receiver comprises a housing and a sensor subassembly, which is located within the housing. The sensor subassembly comprises a mount and a cylindrical piezoelectric crystal coupled to the mount. The sensor subassembly also comprises an isolation ring positioned between one of the ends of the cylindrical piezoelectric crystal and the mount. The isolation ring directly engages the crystal and the mount. The method of acoustic logging comprises receiving an acoustic signal using an acoustic receiver,
(Continued)

which comprises a cylindrical piezoelectric crystal coupled to a mount without an adhesive material. The method also comprises converting the acoustic signal into an electrical signal by the cylindrical piezoelectric crystal and transmitting the electrical signal to a processor via a conductor coupled to the cylindrical piezoelectric crystal.

18 Claims, 6 Drawing Sheets

(51) Int. Cl.
  *G01H 3/00* (2006.01)
  *G01V 1/52* (2006.01)
  *G01N 29/22* (2006.01)
(52) U.S. Cl.
  CPC ............... *G01V 1/52* (2013.01); *G01V 1/523* (2013.01); *G01V 2001/526* (2013.01)
(58) Field of Classification Search
  CPC .... G01V 2210/65; G01V 1/282; G01V 1/308; G01V 2200/16; G01V 2210/1429; G01V 2210/614; G01V 2210/673; G01V 1/40; G01V 2210/123; G01V 2210/1299; G01V 2210/55; G01V 2210/644; E21B 47/14; E21B 47/101
  See application file for complete search history.

(56) References Cited

U.S. PATENT DOCUMENTS

| | | | |
|---|---|---|---|
| 4,674,067 A * | 6/1987 | Zemanek, Jr. | ........ B06B 1/0655 367/25 |
| 5,317,111 A | 5/1994 | Orban et al. | |
| 6,213,250 B1 | 4/2001 | Wisniewski et al. | |
| 2005/0000279 A1 | 1/2005 | Yogeswaren | |
| 2005/0034530 A1 | 2/2005 | Han et al. | |
| 2013/0134981 A1 | 5/2013 | Liu | |
| 2015/0136516 A1 | 5/2015 | Chang et al. | |
| 2017/0108471 A1 * | 4/2017 | Sturtevant | ............ G01N 29/228 |

* cited by examiner

ACOUSTIC RECEIVERS WITH CYLINDRICAL CRYSTALS

This section is intended to provide relevant contextual information to facilitate a better understanding of the various aspects of the described embodiments. Accordingly, it should be understood that these statements are to be read in this light and not as admissions of prior art.

Geologists and geophysicists are interested in the characteristics of the formations encountered by a drill bit as it is drilling a well for the production of hydrocarbons from the earth. Such information is useful in determining the correctness of the geophysical data used to choose the drilling location and in choosing subsequent drilling locations. In horizontal drilling, such information can be useful in determining the location of the drill bit and the direction that drilling should follow.

Such information can be derived in a number of ways. For example, cuttings from the mud returned from the drill bit location can be analyzed or a core can be bored along the entire length of the borehole. Alternatively, the drill bit can be withdrawn from the borehole and a "wireline logging tool" can be lowered into the borehole to take measurements. In still another approach, called "measurement while drilling" ("MWD") or "logging while drilling" ("LWD") tools make measurements in the borehole while the drill bit is still disposed in the borehole. There are a wide variety of logging tools, including resistivity tools, density tools, sonic or acoustic tools, and imaging tools.

An acoustic logging tool collects acoustic data regarding underground formations. The purpose of such a tool is to measure the "interval transit time" or the amount of time required for acoustic energy to travel a unit distance in a formation. In simple terms, this is accomplished by transmitting acoustic energy into the formation at one location and measuring the time that it takes for the acoustic energy to travel to a second location or past several locations. As this is performed using tools under downhole conditions, it is desirable for the electronics used to be robust against such conditions and for sensors to have high sensitivity.

BRIEF DESCRIPTION OF THE DRAWINGS

For a detailed description of the embodiments of the invention, reference will now be made to the accompanying drawings in which.

DETAILED DESCRIPTION

This proposed invention provides a downhole acoustic receiver with a cylindrical piezoelectric crystal mounted without the use of adhesives, thereby providing increased sensor sensitivity and increased robustness under temperature and pressure conditions of downhole environments, such as high pressures up to 30 KSI, temperatures up to 200° C., and vibrations up to 20 g.

Figure 1A:
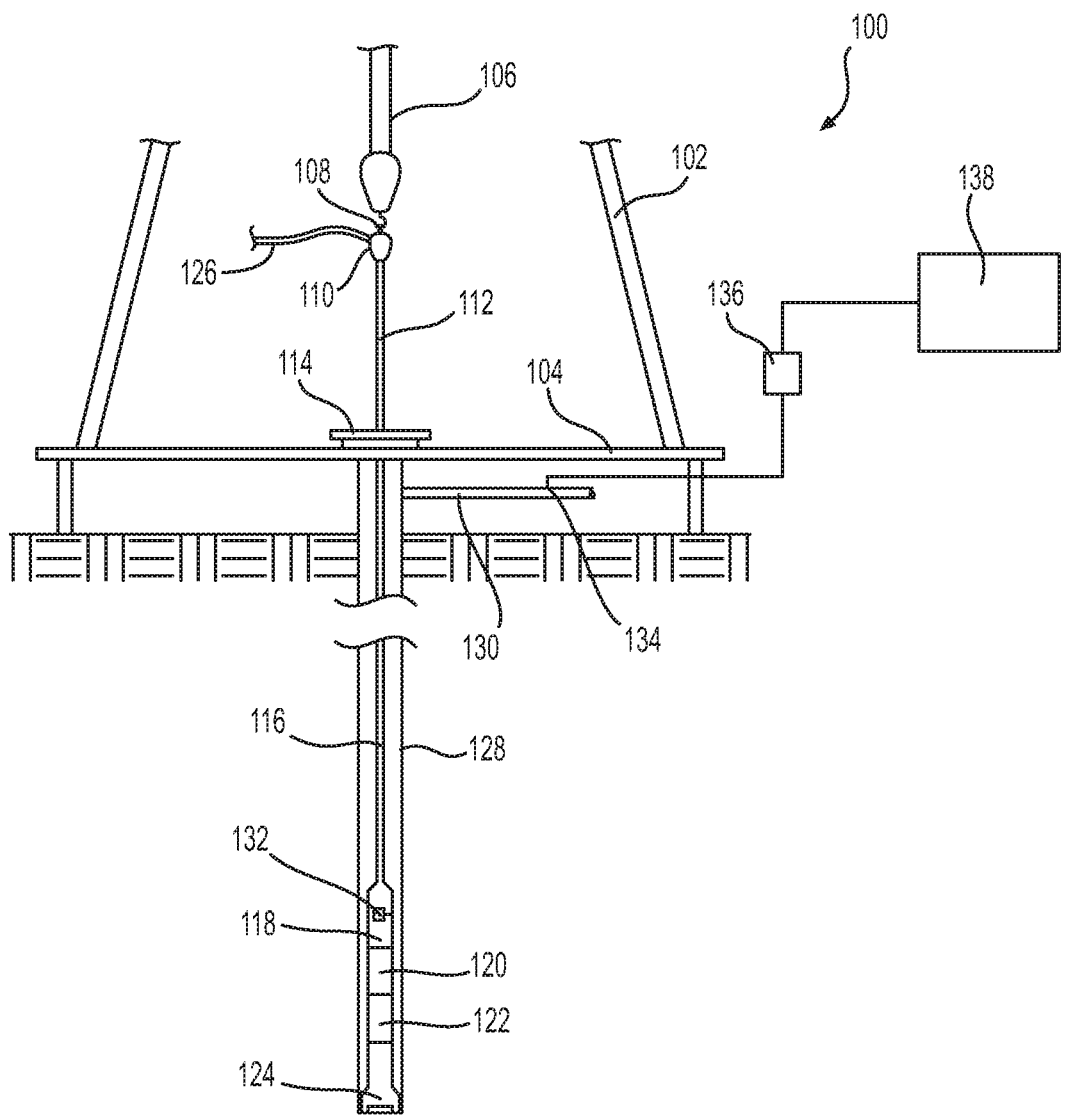
FIG. 1A is a schematic view of a logging while drilling operation incorporating an acoustic logging tool, in accordance with one or more embodiments.

Referring to FIG. 1A, a drilling rig 100 (simplified to exclude items not relevant to this disclosure) comprises a derrick 102, derrick floor 104, draw works 106, hook 108, swivel 110, kelly joint 112, rotary table 114, drillstring 116, drill collar 118, LWD tool 120, LWD acoustic logging tool 122 and drill bit 124. Mud is injected into the swivel by a mud supply line 126. The mud travels through the kelly joint 112, drillstring 116, drill collars 118, and LWD tools 120 and 122 and exits through ports in the drill bit 124. The mud then flows up the borehole 128. A mud return line 130 returns mud from the borehole 128 and circulates it to a mud pit (not shown) and back to the mud supply line 126.

The data collected by the LWD tools 120 and 122 is returned to the surface for analysis by telemetry transmitted through the drilling mud or any other suitable medium such as the drillstring 116. A telemetry transmitter 132 located in a drill collar or in one of the LAM tools collects data from the LWD tools and modulates the data to transmit it through the mud. A telemetry sensor 134 located at the surface detects the telemetry and returns it to a demodulator 136. The demodulator 136 demodulates the data and provides it to computing equipment 138 where the data is analyzed to extract useful geological information.

Figure 1B:
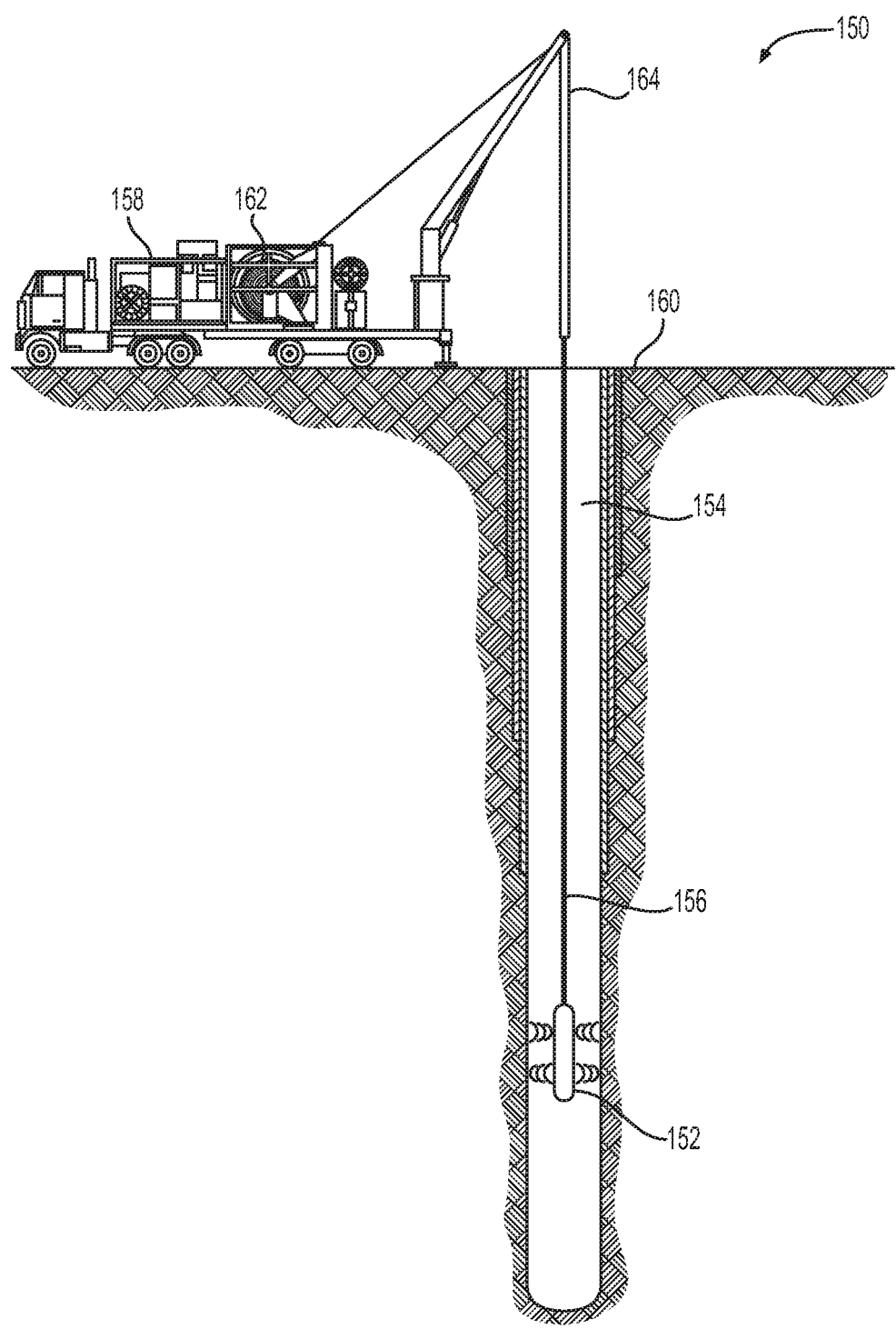
FIG. 1B is a schematic view of a wireline logging operation incorporating an acoustic logging tool, in accordance with one or more embodiments.

In one or more embodiments, the acoustic logging operation may be a wireline operation 150, as illustrated in FIG. 1B, in which an acoustic logging tool 152 is lowered into a well 154 via a wireline 156. The wireline 156 is suspended from a wireline truck 158 parked at a well site 160. The wireline truck 158 may include a wireline spool 162, which supplies the wireline 156. The wireline truck 158 may also include a hoist 164 which suspends the wireline 156 and acoustic logging tool 152 in the well 154. The wireline 156 may alternatively be suspended by various other well site structures such as a rig (not shown). The acoustic logging tool 152 can also be suspended by other forms of conveyance, such as but not limited to, coil tubing, slickline, tractor, and the like. In one or more embodiments, the acoustic logging tool 152 may transmit collected data directly to the surface via the conveyance or store collected data on a memory device in the acoustic logging tool.

Figure 2:
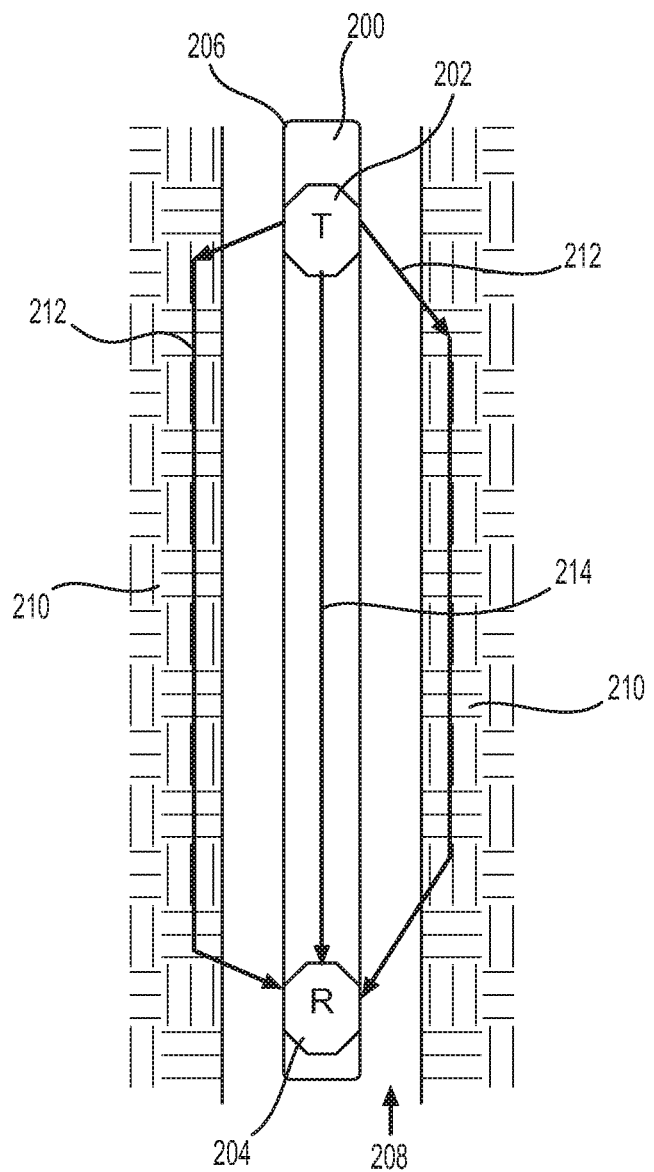
FIG. 2 is a schematic view of an acoustic logging tool, in accordance with one or more embodiments.

FIG. 2 is a diagrammatical depiction of an acoustic logging tool 200, such as the acoustic logging tools 122 and 152 discussed above, which includes an acoustic transmitter 202 and an acoustic receiver 204 supported by a body 206. The acoustic logging tool 200 is inserted in a borehole 208 that extends through a formation 210. The acoustic transmitter 202 emits acoustic energy 212 into the formation 210. The acoustic energy 212 is refracted and travels through the formation 210 along the borehole 208. As the acoustic energy 212 travels along the borehole 208, a portion of the acoustic energy 212 is emitted back into the borehole 208 where it is detected by the acoustic receiver 204. Some acoustic energy 214 emitted by the acoustic transmitter 202 may propagate through the body 206 of the acoustic logging tool 200 to the acoustic receiver 204. By measuring the elapsed time from the transmission of the acoustic energy 212 by the acoustic transmitter 202 to the receipt of the acoustic energy by the acoustic receiver 204, and processing the measurement to cancel the acoustic energy 214, the "slowness" of the formation can be derived. Using the derived slowness of the formation and formation measurements made by other tools (not shown), a variety of formation characteristics can be derived.

Figure 3A:
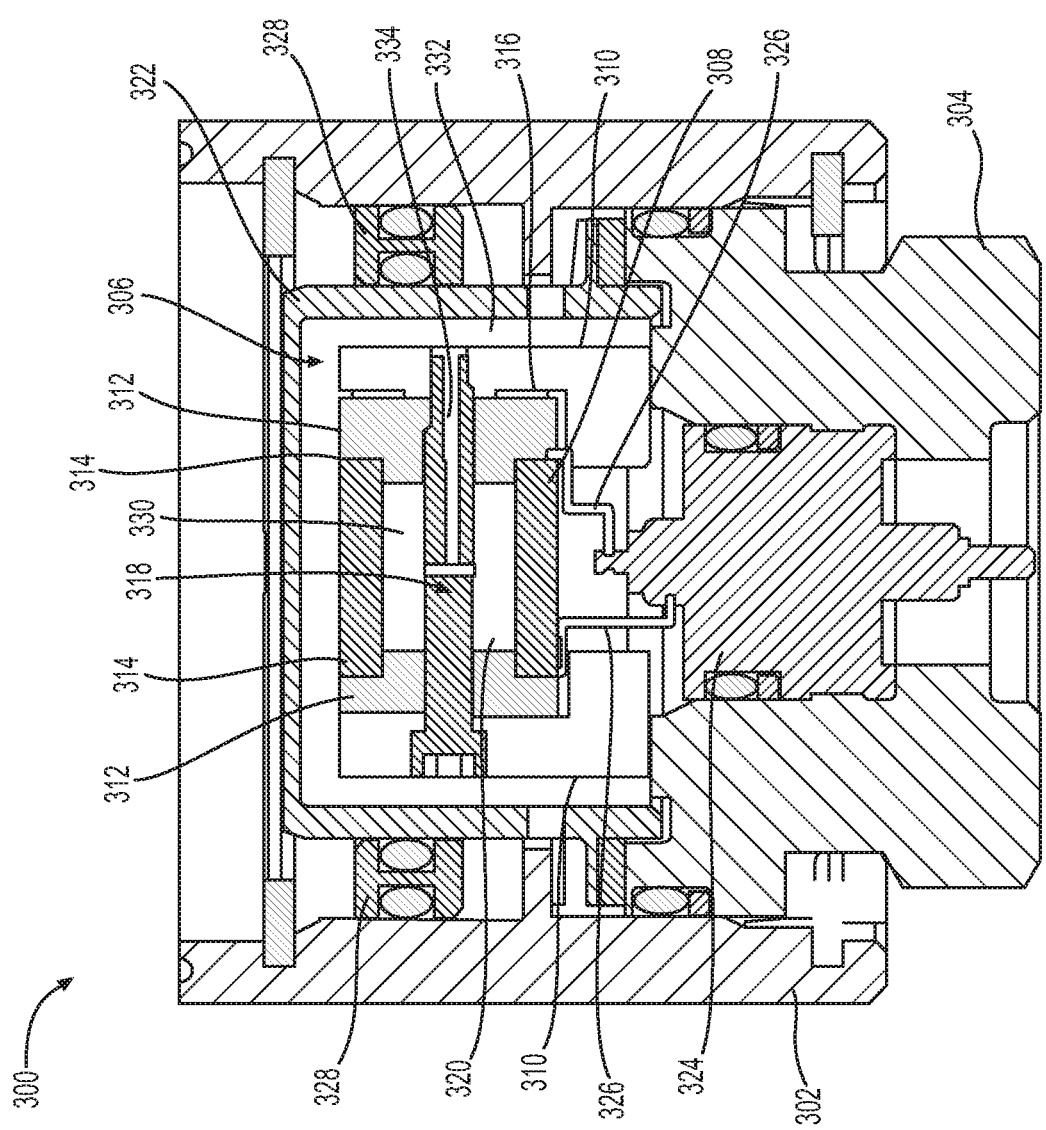
FIGS. 3A and B are cross-sectional views of a receiver with a cylindrical piezoelectric crystal, in accordance with one or more embodiments.

FIGS. 3A and B depict cross-sectional views of a receiver 300, such as the receiver 204 of FIG. 2, in accordance with one or more embodiments. Referring to FIG. 3A, the receiver 300 includes a housing 302 and a housing base 304, which provide a general structure for the receiver 300. The housing 302 and housing base 304 may be fabricated from a suitable material to withstand the temperature and pressure conditions of the downhole environment. A piezoelectric assembly 306 is located within the housing 302. The piezoelectric assembly 306 includes a cylindrical piezoelectric crystal 308 which engages directly with isolation rings 312 at the ends 314 of the piezoelectric crystal 308. The piezoelectric crystal 308 may be formed as a solid cylinder, an open cylinder, or a tubular with a bore 320. The isolation rings 312 and the piezoelectric crystal 308 are coupled between two mounts 310, with the isolation rings 312 isolating the crystal 308 from the mounts 310. The mounts 310 may comprise a metallic material, but may also be made from other suitable materials. The isolation rings 312 may comprise a plastic material, such as polyetheretherketon ("PEEK") but may be made from other suitable materials as well. With the isolation rings 312 and the mounts 310, the crystal 308 can be mounted in the housing 302 without any adhesive or bonding material applied to the crystal 308 between the isolation rings 312. The absence of an adhesive or bonding material in contact with the crystal 308 enhances the reliability and acoustic performance of the receiver 300 over time under high temperature and/or high pressure conditions encountered in the borehole including pressures of 0 KSI to 30 KSI and temperatures of 25° C. to 200° C. In addition, eliminating adhesive or bonding material in contact with the crystal eliminates any uncertainties with the acoustic properties of an adhesive or bonding material and thus the receiver 300 can be manufactured more consistently and the waveform matching obtained from the receiver 300 provides higher quality semblance data and cleaner/clearer dispersion curve.

The cylindrical piezoelectric crystal 308 is oriented such that the axis of the cylindrical crystal 308 is substantially orthogonal to the longitudinal axis of the tool 200. The cylindrical piezoelectric crystal 308 is oriented so that the curved surface of the cylindrical piezoelectric crystal 308 is responsive to acoustic energy in a circumference mode. The cylindrical piezoelectric crystal 308 operating in the circumference mode provides increased sensitivity of the receiver 300 as compared to crystals operating in flat or thickness mode. The increased sensitivity is due to the larger area of the cylindrical piezoelectric crystal 308 along the circumference of the cylindrical surface as compared with flat piezoelectric plates with similar dimensions, as well as the use of d31 electrical and mechanical coupling principles rather than d33 principles. In one or more embodiments, all the piezoelectric crystals used in the receiver 300 are orientated in the same direction for better receiver to receiver matching.

A compressible element 316 such as a disc spring is coupled between one of the isolation rings 312 and one of the mounts 310. The compressible element 316 compensates for the expansion of the crystal 308 as the receiver 300 encounters temperatures and pressures in the borehole. A screw 318 is threaded through from one mount 310 to the other mount 310, traversing the bore 320 of the cylindrical piezoelectric crystal 308. The screw 318 holds the crystal 308, the mounts 310, and the isolations rings 312. The subassembly 306 is constructed and mounted without any adhesive or bonding materials, which enables better robustness of acoustic performance and structural integrity against high temperature and pressure conditions, such as the temperatures and pressures encountered in the borehole.

Figure 4:
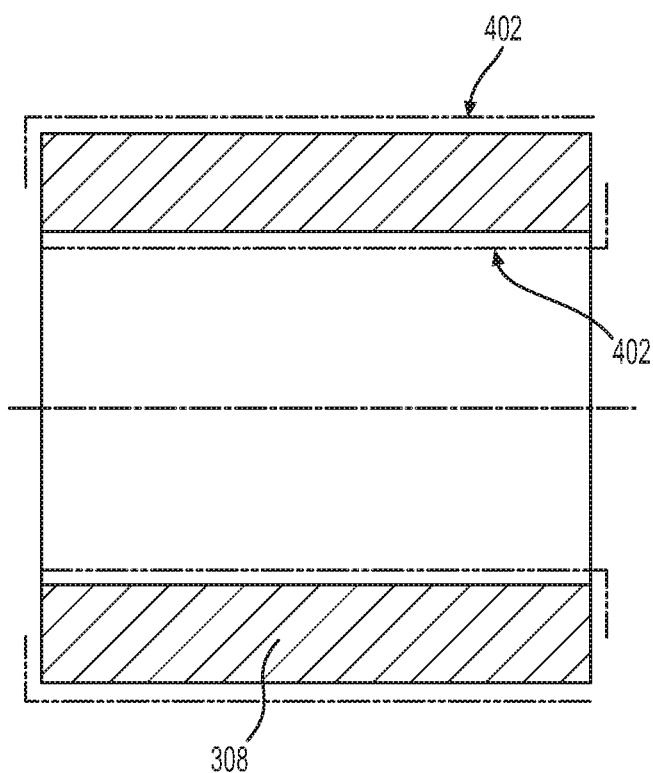
FIG. 4 is a cross-sectional view of a cylindrical piezoelectric crystal with wrap electrodes, in accordance with one or more embodiments.

The subassembly 306 is located within a cap 322 and positioned on the housing base 304. The cap 322 may be fabricated from a polyetheretherketon ("PEEK") material or similar material. As illustrated in FIG. 4, in one or more embodiments, the cylindrical piezoelectric crystal 308 includes wrap-around electrodes 402 which are wound around the wall of the crystal 308 and electrically coupled to a connector 324 via mechanical contacts and/or wires 326. Specifically, one end of the crystal 308 is coupled to an anode of the connector 324 and the other end of the crystal 308 is coupled to the cathode of the connector 324. The connector 324 may be hermetically sealed with the housing base 304.

The receiver 300 further includes one or more pressure compensating pistons 328. The pistons 328 are configured to maintain pressure equilibrium between the internal environment of the receiver 300 and an external environment as the tool 200 travels further downhole and becomes subject to increasing hydrostatic pressure.

Figure 3B:
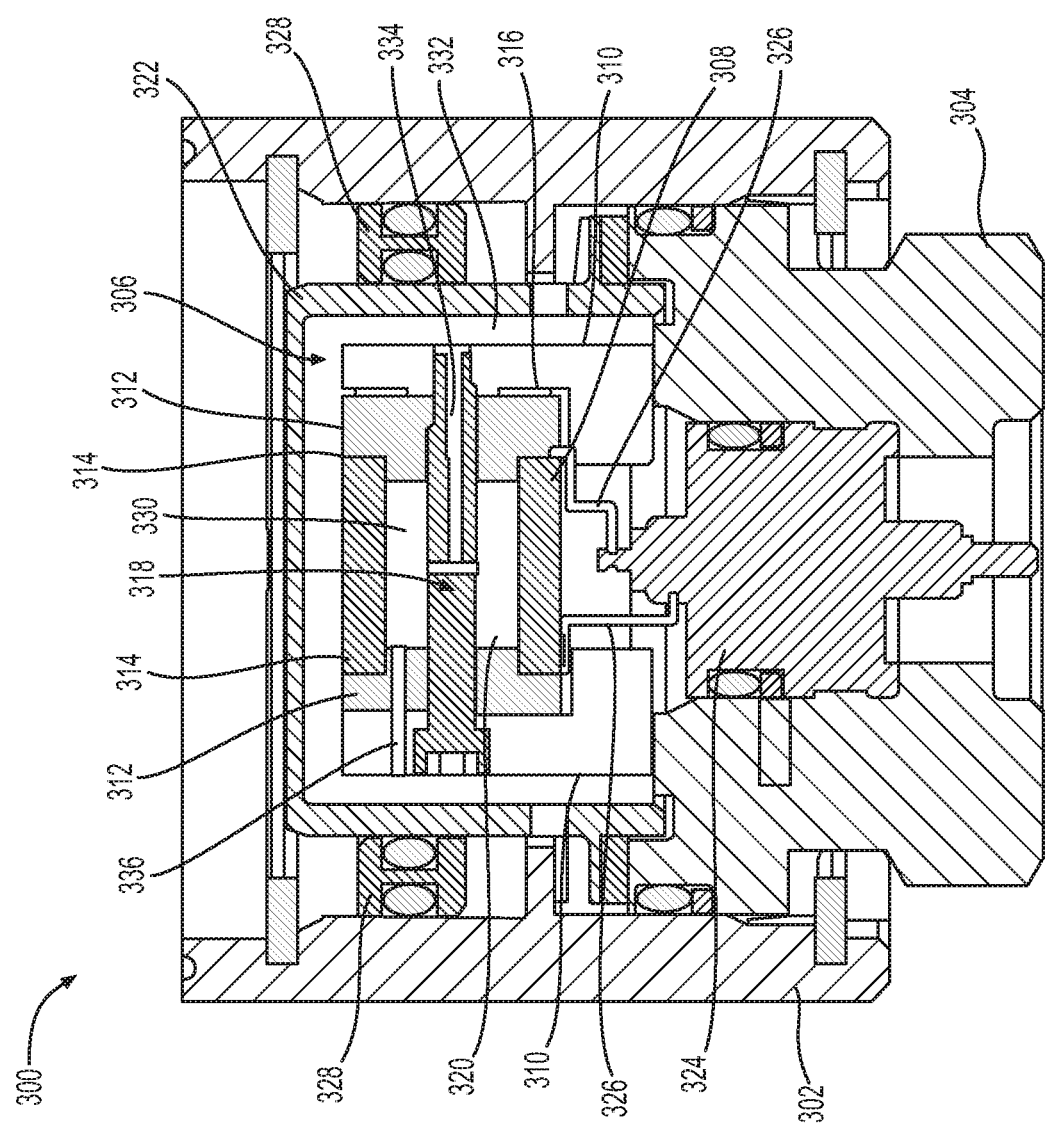

One or more portions of the receiver 300, including the internal cavity 330 and the external cavity 332 of the subassembly, may be filled with a non-conductive pressure balancing fluid such as pressure balancing oil which shrinks as the tool 200 travels further downhole. The receiver 300 further includes a pressure transferring path between the internal cavity 330 and external cavity 332 of the subassembly 306 in order to balance the pressure therebetween. In the illustrated embodiments, a conduit 334 is formed through the screw 318, providing fluid communication between the internal cavity 330 and the external cavity 332. As shown in FIG. 3B, a conduit 336 may be formed through one of the mounts 310 and one of the isolation rings 312 to provide a pressure transferring path between the internal cavity 330 and the external cavity 332.

The subassembly 306 may be secured to the housing base 304 by a screw or other attachment device. The subassembly 306 is contained within a sealed cavity formed by the cap 322, the pistons 328, the housing 302, and the housing base 304, which is fully filled with non-conductive fluid for acoustic propagation and pressure balancing under high pressure, high temperature conditions. In one or more embodiments, the fluid may be air, which facilitates high crystal sensitivity.

In one or more applications of the receiver 300, the cylindrical piezoelectric crystal 308 receives acoustic signals from a borehole and converts the acoustic signal into an electrical signal. The electrical signal is delivered to a processor via a conductor wherein it can be processed into logging data. As previously discussed, the receiver 300 according to the present disclosure eliminates the need for any adhesive or bonding material applied to the crystal 308 which increases the reliability and acoustic performance of the receiver 300 over time under high temperature and/or high pressure conditions encountered in the borehole including pressures up to 30 KSI and temperatures up to 200° C. The cylindrical shape of the piezoelectric crystal 308 also increases the sensitivity of the crystal 308 and thus enhances data collection.

In addition to the embodiments described above, many examples of specific combinations are within the scope of the disclosure, some of which are detailed below:

Example 1: An acoustic receiver for a downhole tool, comprising:

a housing; and a sensor subassembly located within the housing, comprising:
    a mount;
    a cylindrical piezoelectric crystal coupled to the mount and comprising two ends;
    an isolation ring positioned between one of the ends of the cylindrical piezoelectric crystal and the mount, wherein the isolation ring directly engages the crystal and the mount.

Example 2: The acoustic receiver of example 1, wherein the sensor subassembly further comprises an additional mount and an additional isolation ring positioned between the other end of the cylindrical piezoelectric crystal and the additional mount.

Example 3: The acoustic receiver of example 2, wherein the additional isolation ring directly engages the crystal and the additional mount.

Example 4: The acoustic receiver of example 1, wherein the cylindrical piezoelectric crystal is oriented in the housing to be operable in a circumference mode.

Example 5: The acoustic receiver of example 1, wherein the sensor subassembly comprises a screw that couples the mount to an additional mount through the cylindrical piezoelectric crystal.

Example 6: The acoustic receiver of example 5, wherein the screw comprises a conduit formed therein providing fluid communication between an internal cavity within the sensor subassembly and an environment external of the sensor subassembly to pressure balance the cavity and the external environment.

Example 7: The acoustic receiver of example 6, wherein the internal cavity is filled with a non-conductive fluid.

Example 8: The acoustic receiver of example 1, wherein the mount comprises a conduit formed therein that provides fluid communication between a cavity within the sensor subassembly and an environment external of the sensor subassembly to pressure balance the cavity and the external environment.

Example 9: The acoustic receiver of example 1, wherein a compressible element is positioned between one end of the cylindrical piezoelectric crystal and the mount, directly or indirectly.

Example 10: The acoustic receiver of example 1, wherein the cylindrical piezoelectric crystal comprises wrap-around electrodes.

Example 11: The acoustic receiver of example 1, wherein the cylindrical piezoelectric crystal is electrically coupled to a connector via a mechanical coupling.

Example 12: The acoustic receiver of example 1, wherein the cylindrical piezoelectric crystal is formed as a tubular including a bore.

Example 13: A method of acoustic logging, comprising:
    receiving an acoustic signal using an acoustic receiver, wherein the acoustic receiver comprises a cylindrical piezoelectric crystal coupled to a mount without an adhesive material;
    converting the acoustic signal into an electrical signal by the cylindrical piezoelectric crystal; and
    transmitting the electrical signal to a processor via a conductor coupled to the cylindrical piezoelectric crystal.

Example 14: The method of example 13, comprising balancing pressure between an internal cavity within the sensor subassembly and an environment external of the sensor subassembly via a conduit providing fluid communication.

Example 15: The method of example 13, comprising compensating for thermal expansion of the cylindrical piezoelectric crystal via a compressible element coupled to the cylindrical piezoelectric crystal.

Example 16: The method of example 13, wherein the cylindrical piezoelectric crystal is mounted in the housing to be operable in a circumference mode.

Example 17: The method of example 13, further comprising coupling the mount to an additional mount using a screw extending through the cylindrical piezoelectric crystal.

Example 18: The method of example 13, further comprising isolating the cylindrical piezoelectric crystal from the mount by positioning an isolation ring between the cylindrical piezoelectric crystal and the mount.

Example 19: The method of example 18, wherein the isolation ring directly engages with the crystal and one of the metal mounts.

Example 20: The method of example 13, wherein converting the acoustic signal comprises detecting the electrical signal from wrap-around electrodes coupled to the cylindrical piezoelectric crystal.

This discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed may be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. In addition, the terms "axial" and "axially" generally mean along or parallel to a central axis (e.g., central axis of a body or a port), while the terms "radial" and "radially" generally mean perpendicular to the central axis. The use of "top," "bottom," "above," "below," and variations of these terms is made for convenience, but does not require any particular orientation of the components.

Reference throughout this specification to "one embodiment," "an embodiment," or similar language means that a particular feature, structure, or characteristic described in connection with the embodiment may be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. An acoustic receiver for a downhole tool, comprising:
a housing; and
a sensor subassembly located within the housing, comprising:
   a mount;
   a cylindrical piezoelectric crystal coupled to the mount and comprising two ends;
   a screw that couples the mount to an additional mount through the cylindrical piezoelectric crystal; and
   an isolation ring positioned between one of the ends of the cylindrical piezoelectric crystal and the mount, wherein the isolation ring directly engages the crystal and the mount.

2. The acoustic receiver of claim 1, wherein the sensor subassembly further comprises an additional isolation ring positioned between the other of the ends of the cylindrical piezoelectric crystal and the additional mount.

3. The acoustic receiver of claim 2, wherein the additional isolation ring directly engages the crystal and the additional mount.

4. The acoustic receiver of claim 1, wherein the cylindrical piezoelectric crystal is oriented in the housing to be operable in a circumference mode.

5. The acoustic receiver of claim 1, wherein the screw comprises a conduit formed therein providing fluid communication between an internal cavity within the sensor subassembly and an environment external of the sensor subassembly to pressure balance the cavity and the external environment.

6. The acoustic receiver of claim 5, wherein the internal cavity is filled with a non-conductive fluid.

7. The acoustic receiver of claim 1, wherein at least one of the mounts comprises a conduit formed therein that provides fluid communication between a cavity within the sensor subassembly and an environment external of the sensor subassembly to pressure balance the cavity and the external environment.

8. The acoustic receiver of claim 1, wherein a compressible element is positioned between one end of the cylindrical piezoelectric crystal and at least one of the mounts, directly or indirectly.

9. The acoustic receiver of claim 1, wherein the cylindrical piezoelectric crystal comprises wrap-around electrodes.

10. The acoustic receiver of claim 1, wherein the cylindrical piezoelectric crystal is electrically coupled to a connector via a mechanical coupling.

11. The acoustic receiver of claim 1, wherein the cylindrical piezoelectric crystal is formed as a tubular including a bore.

12. A method of acoustic logging, comprising:
receiving an acoustic signal using an acoustic receiver, wherein the acoustic receiver comprises a cylindrical piezoelectric crystal coupled to a mount without an adhesive material, the mounts coupled to an additional mount using a screw extending through the cylindrical piezoelectric crystal;
converting the acoustic signal into an electrical signal by the cylindrical piezoelectric crystal; and
transmitting the electrical signal to a processor via a conductor coupled to the cylindrical piezoelectric crystal.

13. The method of claim 12, comprising balancing pressure between an internal cavity within the sensor subassembly and an environment external of the sensor subassembly via a conduit providing fluid communication.

14. The method of claim 12, comprising compensating for thermal expansion of the cylindrical piezoelectric crystal via a compressible element coupled to the cylindrical piezoelectric crystal.

15. The method of claim 12, wherein the cylindrical piezoelectric crystal is mounted in the housing to be operable in a circumference mode.

16. The method of claim 12, further comprising isolating the cylindrical piezoelectric crystal from one of the mounts by positioning an isolation ring between the cylindrical piezoelectric crystal and the one of the mounts.

17. The method of claim 16, wherein the isolation ring directly engages with the crystal and the one of the mounts.

18. The method of claim 12, wherein converting the acoustic signal comprises detecting the electrical signal from wrap-around electrodes coupled to the cylindrical piezoelectric crystal.

* * * * *